(12) United States Patent
Wallach et al.

(10) Patent No.: US 6,633,150 B1
(45) Date of Patent: Oct. 14, 2003

(54) APPARATUS AND METHOD FOR IMPROVING TRACTION FOR A MOBILE ROBOT

(75) Inventors: Bret A. Wallach, San Diego, CA (US); Harvey Koselka, Trabuco Canyon, CA (US); David Gollaher, San Diego, CA (US)

(73) Assignee: Personal Robotics, Inc., San Diego, CA (US)

( * ) Notice: Subject to any disclaimer, the term of this patent is extended or adjusted under 35 U.S.C. 154(b) by 34 days.

(21) Appl. No.: 09/847,600

(22) Filed: May 2, 2001

Related U.S. Application Data

(60) Provisional application No. 60/201,331, filed on May 2, 2000.

(51) Int. Cl.$^7$ .................................................. B25J 5/00
(52) U.S. Cl. .................. 318/568.12; 15/21.1; 15/53.4; 152/209.17
(58) Field of Search ................. 318/568.12, 568.11; 901/1, 50; 15/21.1, 23, 28, 50.1–50.3, 52, 52.1–52.2, 53.1–53.4, DIG. 2; 291/2; 152/167, 209.17, 210

(56) References Cited

U.S. PATENT DOCUMENTS

| | | | | |
|---|---|---|---|---|
| 602,193 A | * | 4/1898 | Neuert ........................ 15/160 |
| 1,479,841 A | | 1/1924 | Stover |
| 1,824,815 A | * | 9/1931 | Fuchs ........................... 291/1 |
| 2,004,036 A | * | 6/1935 | Coenning .............. 152/209.17 |
| 2,770,469 A | * | 11/1956 | Seda ........................... 280/855 |
| 2,782,053 A | | 2/1957 | Long |
| 3,231,293 A | * | 1/1966 | Loustaunau ................ 15/256.5 |
| 3,336,064 A | * | 8/1967 | Dzaack ............................ 291/1 |
| 3,688,338 A | * | 9/1972 | Lundvall ..................... 15/364 |
| 3,729,763 A | | 5/1973 | Coley |
| 3,779,324 A | * | 12/1973 | Kreske, Jr. .................... 291/1 |
| 4,135,271 A | | 1/1979 | Harding et al. |
| 4,233,703 A | | 11/1980 | Clyne et al. |
| 4,577,366 A | * | 3/1986 | Miller et al. ................... 15/388 |
| 4,667,719 A | | 5/1987 | Masuda |
| 4,756,044 A | | 7/1988 | Clark |
| 4,789,190 A | | 12/1988 | Eike et al. |
| 4,841,591 A | * | 6/1989 | Candow ....................... 15/160 |
| 4,858,270 A | | 8/1989 | Boschung |
| 5,100,175 A | * | 3/1992 | Swallow et al. ............... 291/3 |
| 5,241,724 A | * | 9/1993 | Lim ............................. 15/322 |
| 5,549,146 A | * | 8/1996 | Trabandt et al. ........ 152/209.19 |
| 5,566,420 A | * | 10/1996 | Specht ....................... 15/256.5 |
| 5,857,238 A | * | 1/1999 | Jmill ......................... 15/256.5 |
| 5,860,180 A | | 1/1999 | Heise |
| 5,959,423 A | * | 9/1999 | Nakanishi et al. ...... 318/568.12 |
| 5,961,754 A | | 10/1999 | Benson |
| 6,017,400 A | * | 1/2000 | Clark et al. .................... 15/1.7 |
| 6,099,091 A | * | 8/2000 | Campbell .............. 152/209.17 |
| 6,199,237 B1 | * | 3/2001 | Budden ......................... 15/1.7 |
| 6,199,610 B1 | * | 3/2001 | Yanagawa ................ 152/209.5 |
| 6,334,630 B1 | * | 1/2002 | Barros, Sr. ................. 15/256.5 |
| 6,389,329 B1 | * | 5/2002 | Colens ................... 318/568.12 |
| 6,434,781 B1 | * | 8/2002 | Guerra ....................... 15/256.5 |

FOREIGN PATENT DOCUMENTS

| | | | | |
|---|---|---|---|---|
| DE | 2716110 A | * | 10/1978 | ............. B60S/1/62 |
| JP | 04352927 A | * | 12/1992 | ............. A47L/9/00 |

* cited by examiner

*Primary Examiner*—Robert E. Nappi
*Assistant Examiner*—Edgardo San Martin
(74) *Attorney, Agent, or Firm*—Knobbe, Martens, Olson & Bear, LLP

(57) ABSTRACT

An apparatus and method for improving traction for mobile robots where traction is a concern. The mobile robot of the invention includes wheels and brushes. The wheels are mounted to the body of the robot. The brush is mounted to the body close to the wheels. When the wheels are rotating, the brush rubs against the wheel to get rid of debris on the tread of the wheel and cleans the wheel so that traction for the robot can be improved. An alternative way to improve traction by reducing slippage utilizes suction cups or wiper elements mounted on the wheel.

16 Claims, 3 Drawing Sheets

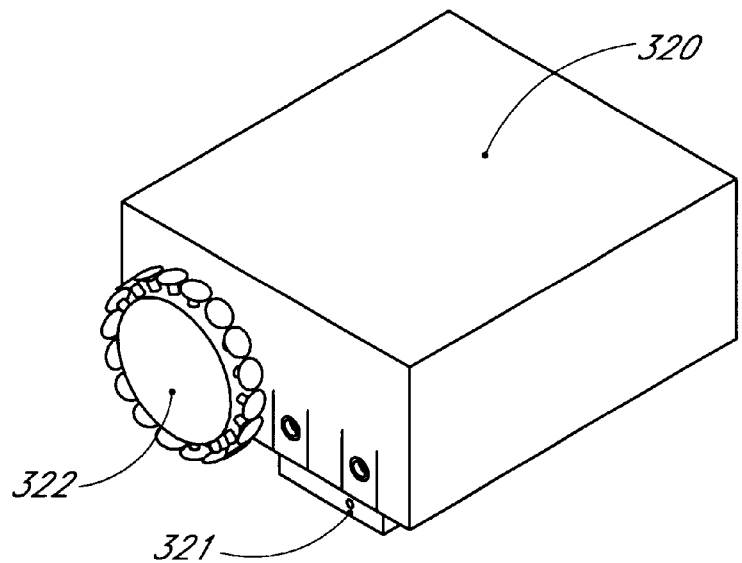
Fig. 3
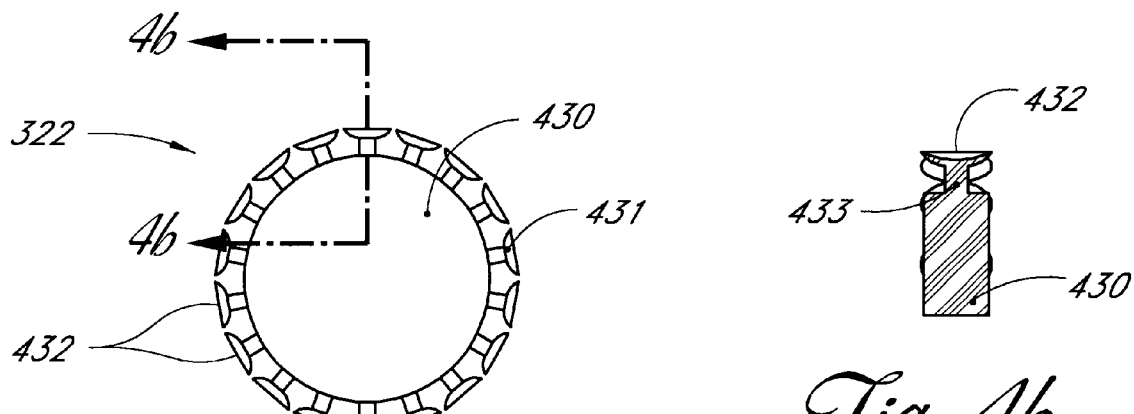
Fig. 4a
Fig. 4b

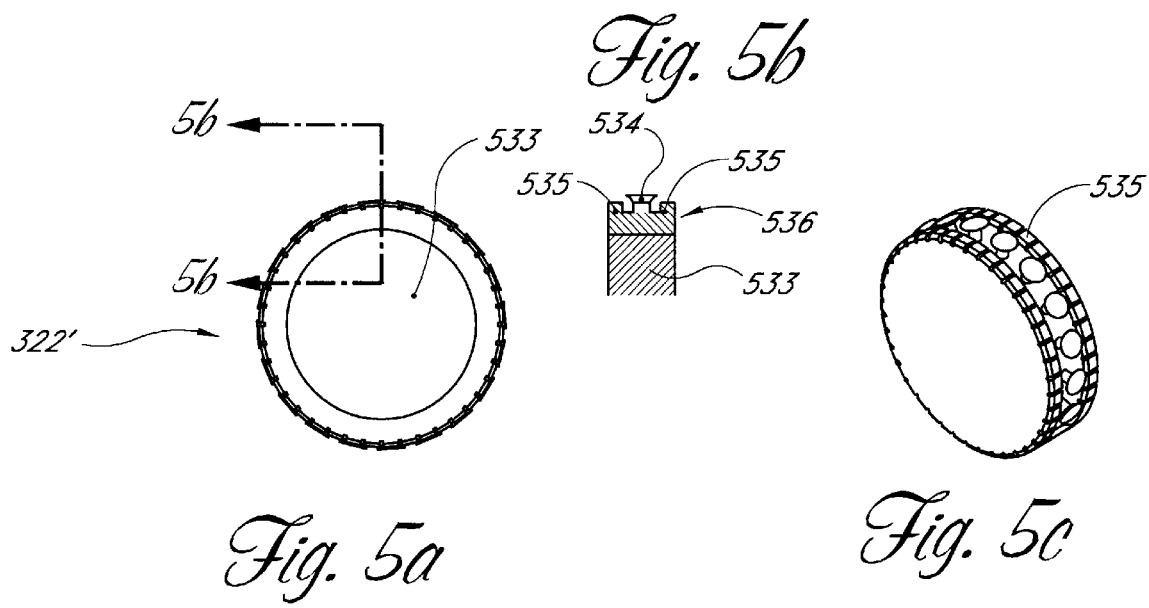
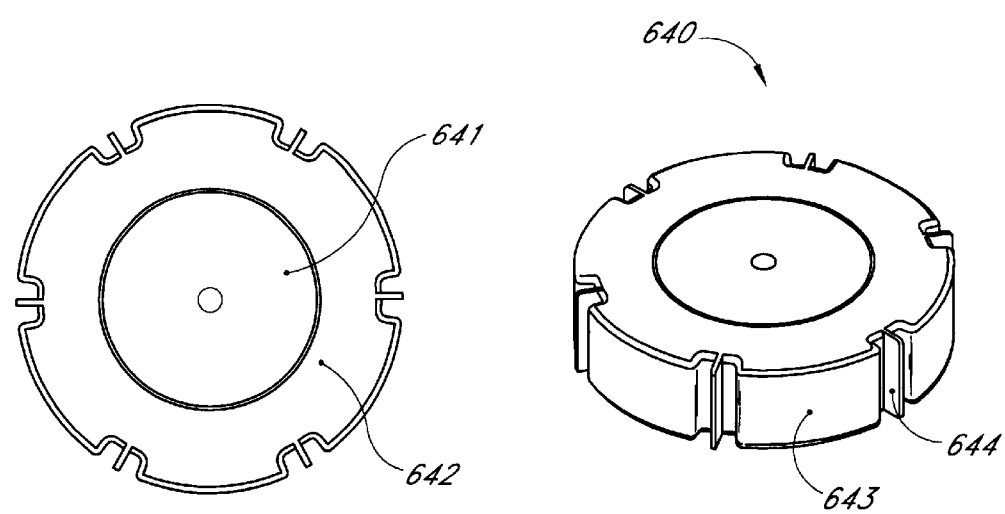

APPARATUS AND METHOD FOR IMPROVING TRACTION FOR A MOBILE ROBOT

RELATED APPLICATIONS

This application claims the benefit of the filing date of U.S. Patent Application No. 60/201,331, entitled "METHOD FOR IMPROVING TRACTION FOR A MOBILE ROBOT", filed on May 2, 2000, which is hereby incorporated by reference.

This patent application is related to U.S. patent application Ser. No. 09/847,598 for "AUTONOMOUS FLOOR MOPPING APPARATUS", concurrently filed May 2, 2001, and which is hereby incorporated by reference.

BACKGROUND

1. Field of the Invention

Aspects of the present invention relate to an apparatus and method for improving traction for wheeled vehicles. More particularly, embodiments of the present invention relate to an apparatus and method for improving traction for mobile robots where traction is a concern.

2. Description of the Related Technology

Mobile robots have been designed, developed and deployed to handle a variety of tasks such as manufacturing and security. As robots become more prevalent in society, they will continue to automate tasks currently performed by people. Household cleaning and maintenance is an obvious application for robotics, and pool cleaning, lawn mowing and vacuum robots have been created. It has advanced to the point where commercial success of household robots has become an implementation, rather than technology, issue.

Robust navigation is the great problem for mobile robots. It is essential for a mobile robot to know its location with precision when navigating through an environment. Keeping track of the position and orientation is known as localization. Dead reckoning localization methods maintain a rough estimate of the robot's change in position with odometry and inertial navigation systems and are often used because of their low cost and simplicity. As robots become smaller and lighter, their wheels become more likely to slip, which causes localization errors that accumulate over time.

The friction between the robot wheels and the ground is what prevents the wheels from slippage. Rubber is commonly used for wheels because of its high coefficient of friction. Real world environments can be dirty, and dirt presents several problems for wheeled robots. As wheels get dirty, the rubber or other material is not as sticky and the wheels are more likely to slip. Also, sand and other hard particles are common components of dirt found on floors. These small abrasive particles can stick to a robot's wheels and scratch the ground. This is not a problem when the ground is a road or sidewalk, but scratches can ruin household floors.

It has been shown on bicycles that flexible wire forms rubbing against the tires can be effective at removing glass and other materials before the tire is punctured. This system has not been employed on other types of vehicles, nor would it be effective against sand or other small abrasives.

It is well known that wheeled vehicles slip on wet surfaces. Standard tires are provided with treads to prevent slippage. Treads are good for channeling water to prevent hydroplaning, and for improving traction on soft and rough surfaces. When hydroplaning occurs, treads allow passage for water flow, so that the tire can remain in contact with the ground. This is a large benefit when there is a significant amount of water. Treads also provide improved traction on soft and rough surfaces where the wheel can grab portions of the ground. However, standard treads are not effective on hard, smooth surfaces especially when a thin layer of water coats surfaces. In that case, friction and weight are the best ways to improve a vehicle's traction. Some robot applications such as a mop are designed to leave a layer of water on smooth floors that greatly increases the chances of wheel slippage.

Therefore, what is needed is an apparatus and method for improving traction and reducing slippage for wheeled vehicles such as mobile robots.

SUMMARY OF THE INVENTION

The present invention is directed to an apparatus and method that improves traction and/or reducing slippage for wheeled vehicles such as mobile robots. One aspect of the invention relates to a mobile vehicle. The vehicle comprises a body, at least one wheel mounted on the body for propelling the body when the wheel is being rotated, and at least one brush for rubbing against the wheel for cleaning when the wheel is being rotated.

Another aspect of the invention relates to a mobile vehicle. The vehicle comprises a body, and at least one wheel mounted on the body for propelling the body when the wheel is being rotated, where the wheel includes suction cups.

Another aspect of the invention relates to a mobile vehicle. The vehicle comprises a body, and at least one wheel mounted on the body for propelling the body when the wheel is being rotated, where the wheel includes wiper sections.

Another aspect of the invention relates to a method for improving traction for a mobile vehicle with a body. The method comprises mounting at least one wheel on the body for propelling the body when the wheel is being rotated, and providing at least one brush for rubbing against the wheel for cleaning when the wheel is being rotated.

Yet another aspect of the invention relates to a mobile robot. The robot comprises a body, at least one wheel mounted on the body for propelling the body when the wheel is being rotated, and at least one brush for rubbing against the wheel for cleaning when the wheel is being rotated.

Still another aspect of the invention relates to a mobile robot. The robot comprises a body, and at least one wheel mounted on the body for propelling the body when the wheel is being rotated, where the wheel includes wiper sections.

BRIEF DESCRIPTION OF THE DRAWINGS

FIG. 3 is a diagram showing a third embodiment of a small robot with suction cup wheels in accordance with the invention.

FIG. 4 is a diagram showing a first embodiment of the suction cup wheel shown in FIG. 3 in accordance with the invention.

FIG. 5 is a diagram showing a second embodiment of the suction cup wheel shown in FIG. 3 in accordance with the invention.

FIG. 6 is a diagram showing an embodiment of a wiper wheel with wipers in accordance with the invention.

DETAILED DESCRIPTION

A wheel's grip on a hard dry surface is the strongest when the wheel is kept clean. That does not depend on whether the wheel is solid, pneumatic or any other composition, or whether it is slick or has a tread. The present invention is directed to an apparatus and method of improving traction for any type of vehicle. In particular, the invention can be used on small, mobile robotic and remote control vehicles where traction is a concern for completing a task and localization. The invention is also directed to an apparatus and method of cleaning wheels mounted to the vehicles.

Figure 1:
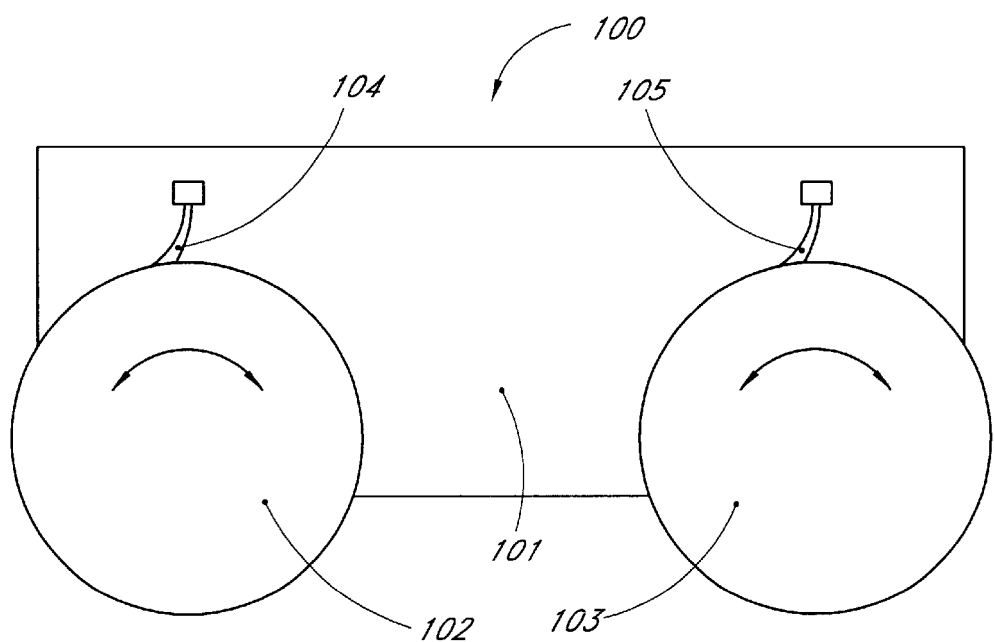
FIG. 1 is a schematic view diagram of a first embodiment of a robotic sweeper that uses stationary brushes to clean the wheels in accordance with the invention.

FIG. 1 shows a small vehicle 100 having stationary brushes placed thereon for continuously cleaning wheels in accordance with one embodiment of the invention. The small vehicle 100 has a body 101 to which a front wheel 103 and a rear wheel 102 are mounted. Only one side of vehicle is shown in FIG. 1. The other side (not shown) also has a front wheel and a rear wheel in the embodiment. A rear brush 104 for the rear wheel 102 and a front brush 105 for the front wheel 103 are attached to the body 101 of the vehicle 100 and have bristles that always contact the rear wheel 102 and the front wheel 103, respectively. In most applications, the wheels 102, 103 only get dirty when in contact with the ground, so the position of the brush 104, 105 is not critical. If the vehicle 100 is typically in the rain, or has debris blown onto the wheels 102, 103, it is preferable to have the brushes 104, 105 located at a place where they clean the wheels 102, 103 just before they make contact with the ground. The brush 104, 105 should be sized to clean the entire width of the wheel 102, 103. The embodiment incorporates the brush 104, 105 with bristles that are stiff enough scrape off the debris, but that do not scratch or harm the wheels 102, 103. It is also possible to use brush equivalents such as a sponge like material.

The body 101 is moved forward or backward by the front and rear wheels 103, 102. The brushes 104, 105 continuously clean their corresponding wheels 102, 103 regardless of whether the vehicle is moving forward or backward. In the embodiment, the brushes 104, 105 can be positioned radially near the wheels 102, 103, respectively, such that the brush's bristles contact the wheels 102, 103. With respect to a light robot floor sweeper, a light pressure to clean the dust and dirt is utilized. Regarding a street cleaner, more pressure and rougher contact is needed. The wheel is self-cleaning when the vehicle moves and the wheel rotates.

Most vehicles have both drive and free spinning wheels. There are several methods for turning wheels. In a system similar to that used in automobiles, an actuator such as a steering wheel can rotate either the drive or free spinning wheels. In such a system, it is preferable to clean both the drive wheels and turning wheels for traction. An alternate embodiment can be realized where two drive wheels are independently powered and steering is achieved by powering the wheels at different speeds. Such a system typically has a free rotating and free spinning wheel to provide stability. It is not necessary to clean the free rotating and free spinning wheel for traction. However, it may be desirable to clean the wheel to prevent hard particles such as sand from sticking to the wheel and scratching the ground.

Figure 2:
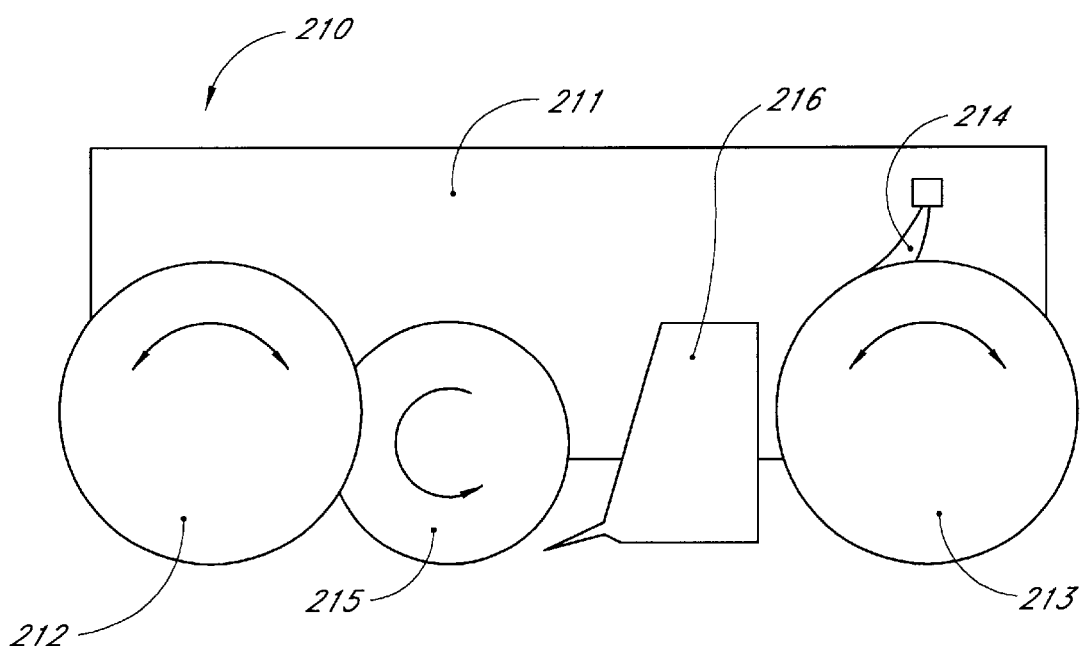
FIG. 2 is a schematic view diagram of a second embodiment of a robotic sweeper that uses a motor-driven brush and a stationary brush to clean the wheels in accordance with the invention.

FIG. 2 shows a sweeping vehicle 210 that uses a motor-driven brush 215 and a stationary brush 214 in accordance with the second embodiment of the invention. The sweeping vehicle 210 is provided with a set of drive wheels 212 and front wheels 213. Only one drive wheel and one front wheel are shown in FIG. 2. The stationary brush 214 is placed on a vehicle body 211 to be in contact with each of the front wheels 213 as in the first embodiment. The stationary brush 214 may be the same as the brush 104, 105 of the first embodiment. The independent motor-driven brush 215 is attached to the body 211 such that it can sweep the floor as the vehicle 210 moves forward and backward. Additionally, the motor-driven brush 215 is located so that it can overlap the drive wheels 212 as shown in the figure. A dustpan 216 is positioned close to the motor-driven brush 215.

The vehicle body 211 is powered to move both forward and backward by the drive wheels 212. The front wheels 213 are free spinning and are cleaned by the stationary brush 214. The motor-driven brush 215 sweeps debris from the ground into the dustpan 216. The motor-driven brush 215 cleans the drive wheels 212 when spinning. Since the brush 215 is driven by a motor (not shown), the brush 215 can be controlled to be on or off. The brush 215 can intermittently make contact with the drive wheels 212. One advantage of this system is that the dynamic nature of the brush 215 against the wheel 212 prevents the wheel from rubbing and wearing the brush at the point of contact, which increases the life of the system. The brush 215 overlaps and cleans the wheels. The advantage of this configuration is that since the brush 215 is spinning, the area contacting the wheel is less likely to take a set and decrease effectiveness over time.

When an intermittent cleaning system may be desirable, a motor-driven brush can be used. As a substitute for a motor, a solenoid, a mechanical or electrical system could be used to move a brush in and out of contact with the wheel. In addition to, or in place of a brush, a scraper, water and cleaning solutions may be used to improve cleaning efficiency. When water and cleaning solutions are used, a tank (not shown) for containing the fluid is provided, which can be controlled to be open or closed for outflow of the fluid.

Using brushes to clean wheels improves traction on hard, dry surfaces, but does not have much effect on wet surfaces. FIG. 3 shows a small robot 320 with a set of suction cup wheels 322 in accordance with the third embodiment of the invention. Only one wheel is shown on the robot of FIG. 3. The robot 320 includes a damp towel 321 mounted to the body of the robot roughly between the suction cup wheels 322. A robot having a towel is described in Applicant's concurrently filed U.S. patent application Ser. No. 09/847,598, entitled "Autonomous Floor Mopping Apparatus". The wheels 322 have a series of suction cups mounted to an outer circumference thereof.

The robot 320 mops by pressing the damp towel 321 against the ground as it moves back and forth. Such robot can be used to clean the floors of a house. Hardwood, linoleum and other smooth surfaces can be extremely slippery when wet. This may be a major problem for a robot mop that is a small, lightweight device that presses non-drive components against the ground. One method to improve traction of a mobile robot on the wet ground is the use of the suction cup wheels 322. The wheel 322 may comprise a series of suction cups on the periphery thereof, instead of riding on a tire or other material. Rather than requiring friction between the wheel and the ground to propel the robot, suction cups stick to the ground. The damp towel provides water that makes the ground slippery and also provides drag that the wheels need to overcome. It is used as an example of a system that needs to reduce slippage such as by use of suction cup wheels, but a vehicle on any wet slippery floor is equivalent.

FIG. 4 shows a first embodiment of the suction cup wheel 322 in accordance with the invention. FIG. 4A shows a diagram of the suction cup wheel 322 that comprises a solid hub 430 and multiple suction cups 432 along a perimeter 431. FIG. 4B shows a cross-section view of one of the suction cups 432 on the wheel. There are many ways to make the suction cups 432. The suction cup can be made from vinyl or other appropriate flexible plastics or rubbers. This embodiment shows each of the suction cups 432 attached to an individual base 433 on the hub 430 of the wheel. It is important to note that the suction cups 432 are sized for each application. If the suction cups 432 are too small or made of a material that will not seal well against the floor, it may not provide sufficient traction. Conversely, if it sticks too well, the small robots may have difficulty pulling the suction cups off the floor.

Aspects of the invention include equipping the robot with wheels containing suction cups or similar geometry to prevent it from sliding on a slippery floor. The suction cups are sized to provide enough traction so the wheel neither spins in place or slides to the side, but not so great that the wheel sticks to the ground with enough force that it gets stuck.

FIG. 5 shows a second embodiment of the suction cup wheel 322' in accordance with the invention. FIG. 5A shows a side view of the suction cup wheel 322'. FIG. 5B shows a cross-section view of the suction cup wheel 322'. FIG. 5C shows a perspective view of the suction cup wheel 322'. The embodiment combines a standard tire 536 with a suction cup wheel, and contains a hub 533 and a series of suction cups 534 along its perimeter. The traditional tire 536 sandwiches the row of suction cups 534, and contains a tread pattern 535. The standard tire provides stability to help on dry and uneven floors. This configuration also limits a load on the suction cups to stop them from being over-pressured.

Both the standard tire tread 535 and the suction cups 534 can be made from rubber or pliable plastic. The tire 536 can be a composite where the suction cups 534 are made from vinyl and glued or otherwise attached to a rubber wheel. In one embodiment, the suction cups 534 are sized such that one makes contact with the ground every ten to thirty degrees of wheel rotation. The tread pattern 535 can range from slick (no tread) to very rough or knobby depending upon the composition of ground and the vehicles driving needs. A tread pattern where grooves or channels in the pattern may be narrow and shallow in depth, or even a smooth tire, is desirable for a fast moving vehicle on a smooth surface. The depth and/or the width of the grooves or channels in the tread pattern 535 can be increased if the surface will likely be covered by water. Tread patterns having deeper and/or wider grooves or channels are preferable on rough or soft surfaces.

Other embodiments may incorporate a more limited array of suction cups within a traditional tire configuration. During use, the tire may slip if a suction cup is not in contact with the floor, but would hold as soon as it turned to where the suction cup engaged. In another embodiment, the suction cups could be arrayed in an overlapping pattern two or more rows thick. This would ensure that at least one suction cup was always engaged on the floor. Similarly, there are many other embodiments that could incorporate this invention to provide traction for mobile robots on hard wet floors.

A further embodiment utilizes an elastic material or a netting to mount on a wheel or smooth tire. The elastic material may have a tread pattern of any of various depths or configurations such as described above. The elastic material or netting may be mounted on the wheel or tire in place of, or in addition to, the tread 535 so that the suction cups 534 are utilized as shown in FIG. 5, or in an alternative location on the periphery of the wheel.

FIG. 6 shows an embodiment of a wiper wheel 640 with wipers in accordance with the invention. FIG. 6A shows a side view of the wiper wheel 640. FIG. 6B shows a perspective view of the wiper wheel 640.

Instead of using suction cups to stick to certain floors, it is also possible to create a tire that cleans the floor. FIG. 6 shows an alternative configuration that has wipers to clean dirt or water if the tire begins to slip. The wheel 640 comprises a solid hub 641 and a rubber or soft plastic tire 642. The tread of the tire 642 is divided into two sections: a main section 643 and a wiper section 644. The main section 643 may be smooth or incorporate a standard tire tread. The smaller wiper section 644 includes a thin blade that extends beyond the main section 643 of the tire tread and throws water or dirt away from the tire if it begins to spin, similar to a windshield washer on a car window.

An arbitrary number of wiper sections can be included around the perimeter of the tire. It should be noted that when the tire is not spinning, the wipers would not perform any function other than that of a standard tire tread in this embodiment. Additionally, the wiper sections in the tire will likely cause a bump each time they roll against the ground, so it is preferable to minimize their number and size. Water or dirt will be cleared from the tire path quicker if there are more wiper sections, but an unsmooth ride is the tradeoff.

These systems will work on any vehicle, or cleaning device, but they are most useful when incorporated into small mobile household robots. Traction is a concern for robust navigation. Also, in a house or other buildings it is desirable not to grind sand and other dirt into the floors from both general cleanliness and scratch standpoints.

Although described above in connection with the particular embodiments of the present invention, it should be understood that the descriptions of the embodiments are illustrative of the invention and not intended to be limiting. Various modifications and applications may occur to those skilled in the art without departing from the true intent and scope of the invention as defined in the appended claims.

What is claimed is:

1. A method for improving traction for a mobile robot, having a body, the method comprising:
   mounting at least one wheel on the robot body for propelling the robot body when the wheel is being rotated; and
   providing at least one brush for rubbing against the wheel so as to clean the wheel and a surface on which the robot moves when the wheel is being rotated.

2. A mobile robot, comprising:
   a robot body;
   at least one wheel mounted on the robot body for propelling the robot body when the wheel is being rotated; and
   at least one brush for rubbing against the wheel so as to clean the wheel and a surface on which the robot moves when the wheel is being rotated.

3. The mobile robot of claim 2, wherein the brush is stationary.

4. The mobile robot of claim 2, wherein the brush is disk or cylindrical shaped.

5. The mobile robot of claim 2, wherein the brush is motor-driven.

6. The mobile robot of claim 2, wherein the brush is mechanically or electrically controlled to be in contact with the wheel.

7. The mobile robot of claim 2, wherein the brush is replaced by a scraper.

8. The mobile robot of claim 2, wherein the brush is replaced by a sponge, cloth or other wiping object.

9. The mobile robot of claim 2, further comprising a tank for water or cleaning solutions so as to discharge water or cleaning solutions onto a tread for cleaning the wheel.

10. The mobile robot of claim 2, wherein the brush is replaced by a tank for water or cleaning solutions.

11. The method of claim 1, additionally comprising controllably rotating the brush independent of the rotation of the wheel.

12. The mobile robot of claim 2, wherein the brush is driven by a motor to rotate in contact with the wheel and the surface.

13. The mobile robot of claim 12, wherein the motor is controlled to be on or off.

14. The mobile robot of claim 6, wherein the brush is controlled to be moved out of contact with the wheel and remain in contact with the surface.

15. A mobile robot, comprising:

a robot body; and at least one wheel mounted on the robot body for propelling the robot body when the wheel is being rotated, wherein the wheel includes wipers configured to clean a surface on which the robot body is propelled, and wherein the wipers are arranged substantially perpendicular to the circumference of the wheel.

16. A mobile robot, comprising:

a robot body; and at least one wheel mounted on the robot body for propelling the robot body when the wheel is being rotated, wherein the wheel includes wipers configured to clean a surface on which the robot body is propelled, and wherein the wipers are disposed in channels which are perpendicular to the rotation of the wheel and are open at the sides of the wheel.

* * * * *